United States Patent
Davis et al.

(10) Patent No.: US 10,372,973 B2
(45) Date of Patent: Aug. 6, 2019

(54) BIOMETRIC IDENTIFICATION

(71) Applicant: BRITISH TELECOMMUNICATIONS PUBLIC LIMITED COMPANY, London (GB)

(72) Inventors: Andrew Gordon Davis, London (GB); Simon Giles Thompson, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/321,379

(22) PCT Filed: Jun. 5, 2015

(86) PCT No.: PCT/GB2015/051635
§ 371 (c)(1),
(2) Date: Dec. 22, 2016

(87) PCT Pub. No.: WO2015/198011
PCT Pub. Date: Dec. 30, 2015

(65) Prior Publication Data
US 2017/0161906 A1 Jun. 8, 2017

(30) Foreign Application Priority Data
Jun. 23, 2014 (EP) .................. 14250085

(51) Int. Cl.
G06K 9/00 (2006.01)
G06K 9/03 (2006.01)
(Continued)

(52) U.S. Cl.
CPC ..... G06K 9/00288 (2013.01); G06K 9/00228 (2013.01); G06K 9/00268 (2013.01);
(Continued)

(58) Field of Classification Search
None
See application file for complete search history.

(56) References Cited

U.S. PATENT DOCUMENTS 8,644,564 B1* 2/2014 Patton ................ G06K 9/00228
382/118
2002/0136435 A1 9/2002 Prokoski
(Continued)

FOREIGN PATENT DOCUMENTS

EP 1 291 807 3/2003
EP 2 023 284 2/2009
(Continued)

OTHER PUBLICATIONS

International Search Report for PCT/GB2015/061635, dated Jul. 6, 2015, 3 pages.
(Continued)

Primary Examiner — Fred H Hu
(74) Attorney, Agent, or Firm — Nixon & Vanderhye P.C.

(57) ABSTRACT

This invention provides a method of face recognition and a device for implementing said method, the method comprising the steps of: (a) performing a face recognition algorithm on an image of a user to determine an identity of the user, the image having an illumination level; (b) determining if a reliability measurement of the identity of the user determined by the face recognition algorithm meets a threshold indicating reliable identification and, if the reliability measurement is below the threshold indicating reliable identification; (c) receiving a new image of the user, the new image having an adjusted illumination level; and (d) performing a further face recognition algorithm on the new image of the user to determine the identity of the user.

15 Claims, 12 Drawing Sheets

(51) Int. Cl.
*G06K 9/20* (2006.01)
*G06K 9/46* (2006.01)
*G06F 9/451* (2018.01)

(52) U.S. Cl.
CPC .......... *G06K 9/036* (2013.01); *G06K 9/2027* (2013.01); *G06K 9/4661* (2013.01); *G06F 9/451* (2018.02)

(56) References Cited

U.S. PATENT DOCUMENTS

| | | |
|---|---|---|
| 2005/0074183 A1 | 4/2005 | Narlow |
| 2005/0229007 A1 | 10/2005 | Bolle et al. |
| 2006/0110008 A1 | 5/2006 | Vertegaal |
| 2008/0147488 A1 | 6/2008 | Tunick |
| 2008/0297589 A1 | 12/2008 | Kurtz |
| 2009/0160609 A1 | 6/2009 | Lin et al. |
| 2010/0205667 A1 | 8/2010 | Anderson |
| 2011/0102553 A1 | 5/2011 | Corcoran |
| 2013/0015946 A1 | 1/2013 | Lau et al. |
| 2013/0215275 A1 | 8/2013 | Berini et al. |
| 2013/0222564 A1 | 8/2013 | Park et al. |
| 2014/0157401 A1 | 6/2014 | Alameh et al. |
| 2014/0169641 A1 | 6/2014 | Lee et al. |

FOREIGN PATENT DOCUMENTS

| | | |
|---|---|---|
| EP | 1 955 290 | 10/2010 |
| EP | 2 701 097 | 2/2014 |
| WO | WO 2015/198012 | 12/2015 |
| WO | WO 2015/198013 | 12/2015 |

OTHER PUBLICATIONS

Written Opinion of the ISA for PCT/GB2015/061635, dated Jul. 5, 2015, 6 pages.
Written Opinion of the International Preliminary Examining Authority for PCT/GB2015/061635, dated May 17, 2016, 4 pages.
International Preliminary Report on Patentability for PCT/GB2015/061635, dated Sep. 20, 2016, 7 pages.
Search Report for EP 14250085, dated Nov. 21, 2014, 7 pages.
Boehm et al., "SAFE: Secure Authentication with Face and Eyes", *IEEE PRISMS 2013*, Jun. 27, 2013, 8 pages.
[Online] Anonymous, "Mug Shot—Wikipedia, the free encyclopedia", Jun. 19, 2014, 6 pages.
Hessey et al., ""Crowdsense"—Initiating New Communications and Collaborations between People in a Large Organization", *HCI in Business*, 2014, pp. 638-648.
Sellahewa et al., "Image-Quality Based Adaptive Face Recognition", *IEEE Transactions on Instrumentation and Measurement*, vol. 59, No. 4, Apr. 2010, pp. 805-813.
Adini et al., "Face Recognition: The Problem of Compensating for Changes in Illumination Direction", *IEEE Transactions on Pattern Analysis and Machine Intelligence*, vol. 19, No. 7, Jul. 1997, pp. 721-732.
Office Action dated Feb. 6, 2018, issued in Davis, et al., U.S. Appl. No. 15/321,358, filed Dec. 22, 2016 (6 pages).
U.S. Appl. No. 15/321,358 of Davis, et al., filed Dec. 22, 2016 (44 pages).
Office Action dated Oct. 1, 2018 issued in U.S. Appl. No. 15/321,358 (7 pgs.).

* cited by examiner

BIOMETRIC IDENTIFICATION

This application is the U.S. national phase of International Application No. PCT/GB2015/051635 filed 5 Jun. 2015, which designated the U.S. and claims priority to EP Patent Application No. 14250085.9 filed 23 Jun. 2014, the entire contents of each of which are hereby incorporated by reference.

FIELD OF THE INVENTION

The present invention relates to biometric identification using face recognition. In particular, but not exclusively, this invention relates to face recognition in interactive terminals.

BACKGROUND TO THE INVENTION

Biometric identification is a method for identifying individuals using measurable biometric identifiers (or 'traits'), such as their face, DNA, or fingerprint. The method is often used to identify or verify the identity of an individual. Many biometric identifiers, such as DNA, have a high level of uniqueness and reliability when identifying or verifying the identity of individuals. However, face recognition technology suffers from a relatively low reliability, particularly due to the likelihood of a face or its expression changing over time (i.e. a lack of 'permanence' in the terminology of the art).

Although relatively unreliable, face recognition is still a popular biometric as it may be implemented using basic technology (e.g. an imaging sensor coupled to a computing device), may be carried out quickly, and may be used without the target's knowledge. Accordingly, many solutions have been proposed to improve the performance of face recognition algorithms. These solutions can generally be grouped into one of two categories—control, in which the image capture environment is optimized, or mitigation, in which the adverse effects of any factors present in the image are minimized.

Control based solutions are particularly applicable in cooperative user applications (such as access control, token-based identification verification and computer logon), in which a user cooperates with the image capture process. In such situations, the image capture environment may be tightly controlled, such that lighting, the user's pose, and the user's expression may be directed or influenced to improve the reliability of the face recognition algorithm.

US Patent Application Publication no. 2013/0215275 A1 discloses an enrolment kiosk implementing several control based solutions to improve the reliability of a face recognition algorithm. The enrolment kiosk includes a screen and a camera, and a pair of LED light assemblies for illuminating the user during the face recognition process. The kiosk encourages the user to look at the camera, takes an initial image of the user's face, and analyses this initial image to determine certain qualities (for example, a comparison of the lighting level on one side of the face to the other side). Once analysed, the kiosk then controls the lighting assemblies such that the face is evenly illuminated, and takes a subsequent image to be used in the comparison with a training set of images during the face recognition process. The subsequent image, having a more even distribution of light, will reportedly improve the reliability of the face recognition algorithm.

Mitigation based solutions are particularly applicable to non-cooperative user applications (in which the user is not aware of the face recognition process, such as in surveillance), but are also used in combination with control based solutions in cooperative user applications. Mitigation techniques include pre-processing normalization of a training image set, the use of illumination-invariant face descriptors, the controlled inclusion of multiple poses within the training image set, and the use of 3D modelling and rotation of the training image set.

Articles "Image-Quality-Based Adaptive Face Recognition", Sellahewa and Jassim, IEEE Transactions on Instrumentation and Measurement, Vol. 59, No. 4, April 2010, and "Face Recognition: The Problem of Compensating for Changes in Illumination Direction", Adini, Moses and Ullman, IEEE Transactions on Pattern Analysis and Machine Intelligence, Vol. 19, No. 7, July 1997, both discuss mitigation techniques for dealing with imperfect illumination of the user's face. In particular, the first article discloses adapting illumination normalization (a form of pre-processing of an input image) based on an estimate of the lighting conditions for the input image. In effect, it pre-processes the input image to better match the illumination of the training image. The second article gives a general discussion on various mitigation techniques for varying illumination and facial expressions.

The present inventors have recognized that the current techniques for increasing the reliability of face recognition algorithms may be improved, particularly when applied to interactive terminals (such as public-space touch-interactive information terminals). These terminals may offer automatic face recognition to identify a user and, once identified, personalize their displays to increase engagement with the user. However, there are several factors which make this difficult to implement in a consistently reliable manner. Firstly, the face recognition process is not a primary purpose for the terminal such that it is not appropriate to enforce the control based solutions (e.g. lighting or pose/expression control) on the user. For example, increasing the level of lighting can create an unfavourable user environment, either dazzling the user or creating harsh shadows. Secondly, interactive terminals are often placed indoors such that their exact location is usually based on factors other than optimal lighting for the face recognition process. Accordingly, the face recognition algorithm for interactive terminals suffers a poor level of recognition reliability.

U.S. Pat. No. 8,644,564 discloses a facial recognition method in which an illumination level is set at an initial level and a face recognition process is performed. If no face is recognised, a face detection process is performed at increasing levels of illumination until a face is detected. Once a face is detected, a first illumination level is set to the level that provided a successful face detection. Then, a face recognition process is performed at increasing levels of illumination until a face is recognised. Once a face is recognised, a second illumination level is set to the level that provided a successful face recognition. This is used to calibrate the illumination levels of the terminal.

It is therefore desirable to alleviate some or all of the above problems.

SUMMARY OF THE INVENTION

According to a first aspect of the invention, there is provided a method of face recognition, the method comprising the steps of: (a) performing an initial face recognition algorithm on an initial image of a user to determine the identity of the user, the initial image having an initial illumination level; (b) determining if a reliability measurement of the identity of the user determined by the initial face recognition algorithm meets a first threshold, the first threshold indicating possible identification and, if the reliability measurement is above the first threshold indicating possible identification; (c) performing a face recognition algorithm on an image of a user to determine an identity of the user, the image having an illumination level; (d) determining if a reliability measurement of the identity of the user determined by the face recognition algorithm meets a second threshold, the second threshold indicating reliable identification and, if the reliability measurement is below the second threshold indicating reliable identification; (e) receiving a new image of the user, the new image having an adjusted illumination level; and (f) performing a further face recognition algorithm on the new image of the user to determine the identity of the user.

The present invention therefore provides a method of face recognition which only adjusts the illumination level for an image when the reliability (i.e. confidence) measure of the identity of the user is below a threshold. The method therefore uses a feedback loop based on the reliability measure of the user's identity. In this manner, when applied to an interactive terminal having lights for illuminating the user, the illumination level may be increased by an amount which is necessary in order to achieve a reliable identification. The skilled person will understand that using the reliability measure of the user's identity is an improvement over the prior art technique of increasing the lighting level based on the perceived "quality" of an input image, which may result in the lighting level not being increased enough or increased more than is necessary. Thus, the likelihood of the terminal dazzling a user with overly bright lights is reduced.

The method may further comprise the step of: determining if a reliability measurement of the identity of the user determined by the further face recognition algorithm meets a threshold indicating reliable identification and, if the reliability measurement is below the threshold indicating reliable identification, repeating steps (e) and (f). Thus, the process may repeat and incrementally increase the illumination levels of subsequent images until the reliability measure of the user's identity meets the threshold indicating reliable identification. This process may be repeated iteratively a predetermined number of times or until a time period has expired.

Furthermore, by determining if the reliability measurement of the identity of the user using the initial image meets a threshold indicating possible identification, the process may only proceed to the following steps of increasing the illumination level in situations where reliable identification is possible. This prevents the process increasing the illumination level for users when there is no or little chance of reliable identification (e.g. when the user has not uploaded a training image or their appearance has substantially changed).

The method may be for face recognition on an interactive terminal, the interactive terminal may have a screen which may be personalized upon identification of a user, and the method may further comprise the step of: personalizing the interactive terminal's screen upon identification of the user. Thus, interactive terminals may offer a semi-cooperative identification process, in which the user may interact with the terminal in a limited way until a background identification process is complete and, upon identification, the terminal may be personalized for the user.

The interactive terminal may have a screen adapted to display a plurality of functions, wherein at least one of the plurality of functions may be personalized upon identification of a user, and the method may further comprise the step of: personalizing the at least one of the plurality of functions upon identification of the user. Thus, the interactive terminal may only implement the face recognition method if a function which may be personalized is accessed by the user.

The interactive terminal may further include a light and the illumination level may be adjusted by increasing the lighting level of the light. Alternatively, the illumination level may be adjusted by increasing the lighting level of the screen or a part of the screen.

A computer program is also provided containing computer-executable code which, when executed on a computer, causes the computer to perform the steps of the method of the first aspect of the invention.

According to a second aspect of the invention, there is provided a device for face recognition comprising a processor adapted to: (a) perform an initial face recognition algorithm on an initial image of a user to determine the identity of the user, the initial image having an initial illumination level; (b) determine if a reliability measurement of the identity of the user determined by the initial face recognition algorithm meets a first threshold, the first threshold indicating possible identification and, if the reliability measurement is above the first threshold indicating possible identification; (c) perform a face recognition algorithm on an image of a user to determine an identity of the user, the image having an illumination level; (d) determine if a reliability measurement of the identity of the user determined by the face recognition algorithm meets a second threshold, the second threshold indicating reliable identification and, if the reliability measurement is below the second threshold indicating reliable identification; (e) receive a new image of the user, the new image having an adjusted illumination level; and (f) perform a further face recognition algorithm on the new image of the user to determine the identity of the user.

The processor may be further adapted to: (g) determine if a reliability measurement of the identity of the user determined by the further face recognition algorithm meets a threshold indicating reliable identification and, if the reliability measurement is below the threshold indicating reliable identification, repeating steps (e) and (f).

The processor may be adapted to repeat steps (e), (f) and (g) iteratively. The processor may be adapted to repeat steps (e), (f) and (g) iteratively until a time period has expired or a predetermined number of times.

The device may be an interactive terminal and may further comprise a screen, wherein the processor may be further adapted to personalize the screen upon identification of the user.

The processor may be further adapted to display a plurality of functions on the screen, wherein the processor may be adapted to personalize at least one of the plurality of functions upon identification of a user.

The device may further comprise a light having an adjustable lighting level, wherein the processor adjusts the illumination level by increasing the lighting level of the light. Alternatively, the processor may adjust the illumination level by increasing the lighting level of the screen or a part of the screen.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 3:
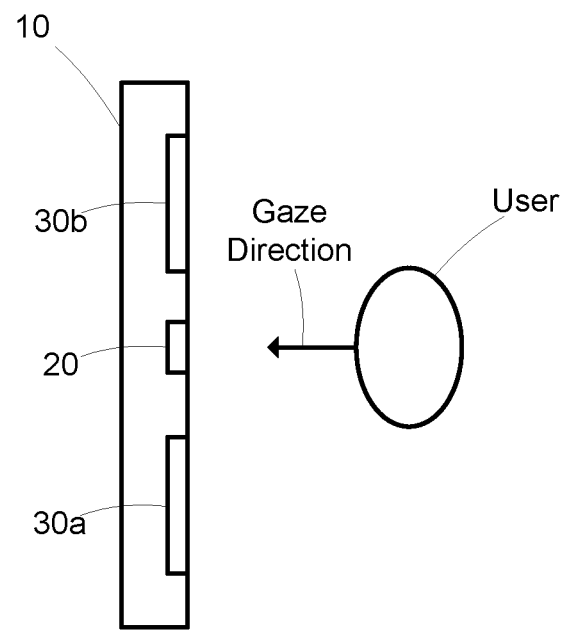
FIG. 3 is a plan view illustrating a user standing in front of the interactive terminal of FIG. 1.

The following embodiments of the inventions describe interactive terminals (i.e. kiosks) implementing various methods of face recognition technology. However, the skilled person will understand that the inventions are not limited to this application, and may therefore be applied in any face recognition application. Before the inventions are described in more detail, a general overview of an interactive terminal employing face recognition technology will be described with reference to FIGS. 1 and 3.

General Overview

Figure 1:
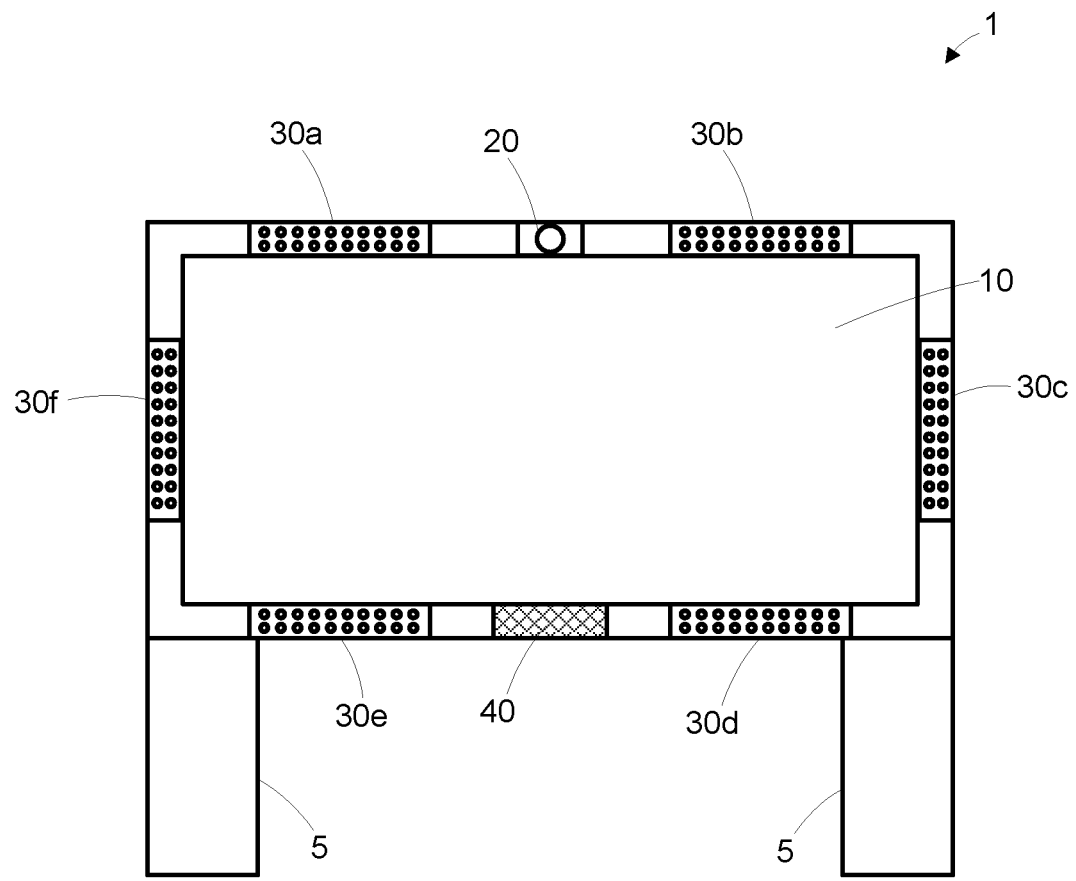
FIG. 1 is a front view of an interactive terminal of an embodiment of the present invention.

FIG. 1 is a front view of an interactive terminal 1, having a stand 5, touchscreen display 10, a front facing camera 20 positioned on top of the touchscreen display 10 at a central location, a plurality of LED lighting arrays 30a . . . 30f disposed about the edge of the touchscreen display 10, and a microphone/speaker 40.

Figure 2:
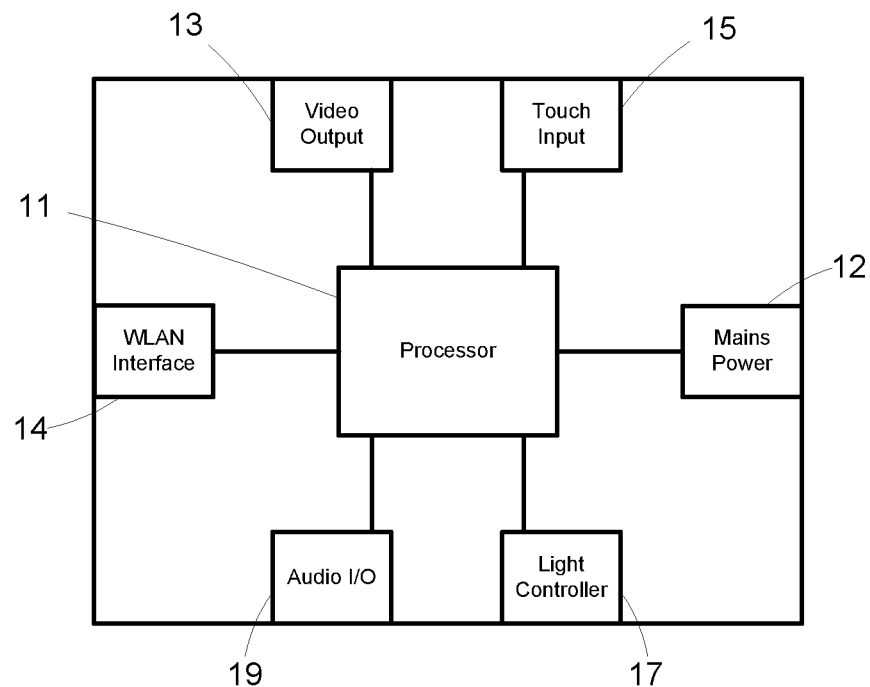
FIG. 2 is a schematic diagram of internal components of a touchscreen of the interactive terminal of FIG. 1.

In this embodiment, the touchscreen display 10 is a 52-inch touchscreen configured to process multiple touch inputs or gestures from a user. The internal components of the touchscreen display 10 are shown in FIG. 2. As shown in this schematic diagram, the touchscreen display 10 includes a processor 11 operatively coupled to: a video output 13 such that the processor 11 may control the image displayed on the touchscreen display 10; a touch input 15 such that the processor 11 may receive signals generated by the touchscreen display 10 in response to a touch or gesture by the user and interpret the position of the touch or gesture relative to the touchscreen display 10 and thus the particular image or icon the user is interacting with; a light controller 17 such that the processor 11 may control the lighting level of each LED lighting array 30a . . . 30f individually; and an audio input/output 19 connecting the processor 11 to the microphone/speaker 40.

The terminal 1 also includes a mains power supply 12 and a networking interface 14. In this embodiment, the networking interface 14 is a Wireless Local Area Network, WLAN, interface (e.g. one of the IEEE 802.11 ("Wi-Fi") family of standards) allowing the terminal 1 to exchange data over a secure connection with an Access Point in a WLAN. The WLAN includes a secure database, which stores user data including a training image or set of training images of each user (this will be explained in more detail below).

A user may stand in front of the terminal 1 and interact with it by touching one or more parts of the touchscreen display 10. In the embodiment shown in FIG. 3, the user is standing in a location central to the touchscreen display 10 (which is therefore directly in front of the camera 20), and is facing towards the centre of the touchscreen display 10 (the user's gaze direction is illustrated with the arrow in FIG. 3).

In use, the terminal 1 may initially display a 'log-on' screen via the touchscreen display 10 (which, as is well known in the art, is a user authentication screen which allows the user to verify their identify to gain access to the main functionality of the terminal 1, or alternatively log on as a guest with limited functionality). The terminal 1 supports face recognition technology to verify the identity of the user, which will be explained in more detail below, or, alternatively, a new user (who has not yet uploaded a training image or set of training images to the terminal 1 and therefore cannot yet be verified via face recognition) may log on using a personal identification number, password, token-based authentication (e.g. a card having a chip or QR code) or via the guest option (although only limited functionality may be accessed as a guest). The log-on screen typically requires the user to initially set up an account with the terminal 1 (which may be done via an administrator or, for example, a web-based portal).

Once the user has accessed the terminal 1, the terminal 1 displays a 'home' screen via the touchscreen display 10 (which, as is well known in the art, is a central point for the system to launch applications or access files, such as by shortcut icons, and for other applications to display notifications or messages to the user). The home screen and all applications may be personalized such that, when the user's identity is verified by the face recognition technology such that the user may access their account on the terminal 1, it displays applications, files and notifications which are specific to the user. Alternatively, if the user does not have an account and must therefore sign in as a guest, the home screen would not offer such personalization.

The user may also configure their account on the terminal 1, for example by linking it with other accounts (such as a corporate or personal email account) or by uploading biographical or skills based information. The terminal 1 may then use this information to further personalize the home screen or any one of the applications. For example, notifications regarding the user's area in the organization or messages from the user's corporate email account may be displayed on the home screen.

In this embodiment, the terminal 1 omits the authentication step via the log-on screen. Instead, the terminal 1 is configured to display the home screen to the user, wherein the home screen only offers limited functionality at first (e.g. it is in a guest mode). The user may interact with the terminal 1 in any way permitted in guest mode, whilst the terminal 1 attempts to identify the user via face recognition using the camera 20 and processor 11. Once identified, the terminal 1 may then indicate to the user (via the touchscreen display 10) that the identification process is complete and they have logged into their account. Thereafter, the terminal 1 may personalize the home screen and any application such that all applications, files and notifications are specific to the user. Thus, in this embodiment, the terminal 1 appears more inviting to the user (as it does not insist on an identity verification process to access the home screen), but still offers the same level of access control and personalization via a passive identification process. In other words, the terminal offers a semi-cooperative identification application, such that the user may be aware that they are being identified but there is no active control of the user by the terminal 1.

Figure 4:
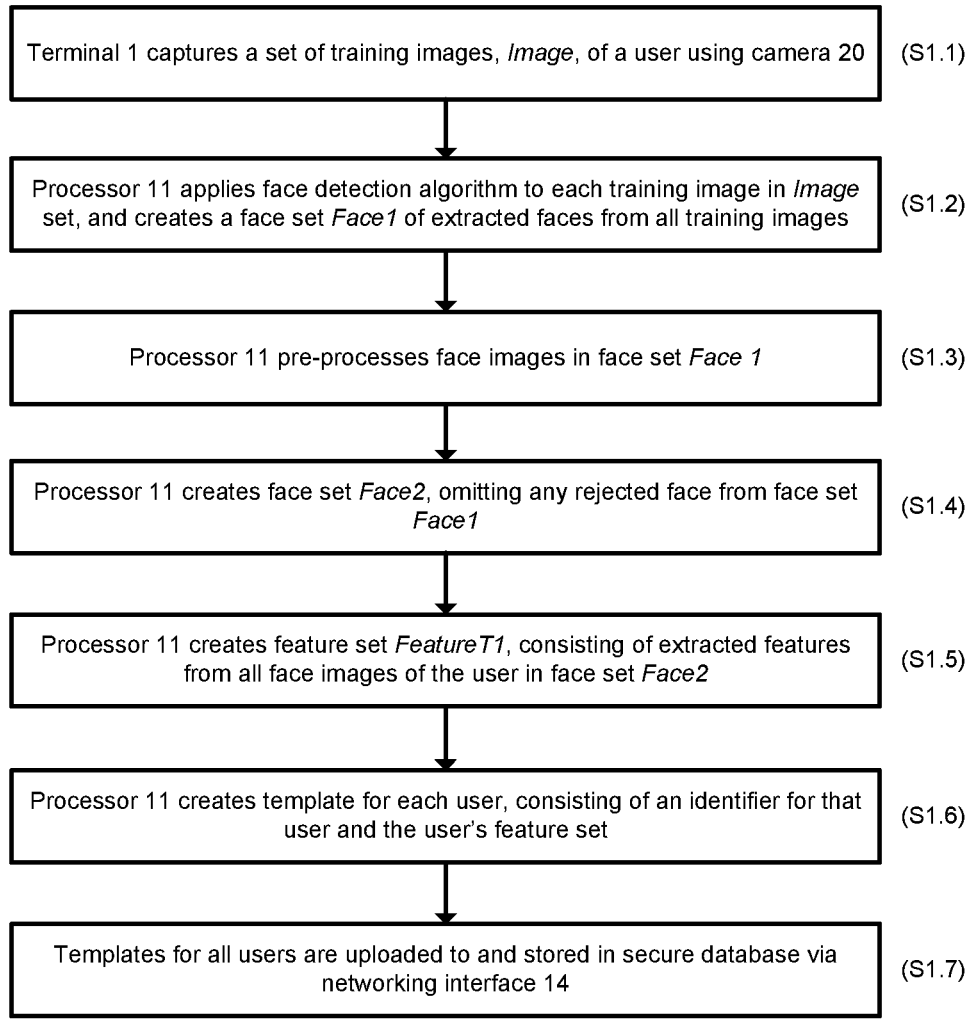
FIG. 4 is a flow diagram of an embodiment of a first enrolment method implemented by the interactive terminal of FIG. 1.

As noted above, access control in the terminal 1 is performed by a face recognition method using the camera 20 and processor 11 of the terminal 1. Accordingly, an initial phase of enrolment, which involves the biometric information of a user being captured and stored, is performed for all users such that a user may subsequently be identified. The enrolment process will now be described with reference to FIG. 4.

In a first step of the enrolment phase (step S1.1), the terminal 1 captures a set of training images of a user ('image$_n$', wherein each training image is captured at time instant 'n') using the camera 20 (alternatively, a set of training images of the user may be uploaded to the terminal 1). These training images are of one user only during the enrolment phase and may capture the user with a variety of poses (e.g. gaze direction, facial expression, adornments etc.). Each image of the user may be stored as function 'image$_n$' as a set of P pixel values $p_i$, wherein each pixel may be represented by a single grey-scale intensity value (or alternatively a set of colour and intensity values):

$$\text{image}_n = \{p_{n,i} | i=1 \ldots P\}$$

Thus, a set of N training images for the user is captured over a particular time interval. This set of training images is defined in image set, Image:

$$\text{Image} = \{\text{image}_n | n=1 \ldots N\}$$

In the next step of the enrolment phase (step S1.2), each training image in the Image set may have a face detection algorithm applied to identify the user's face within each training image. In this embodiment, the Haar Feature-Based Cascade Classifier algorithm is used (details of this algorithm may be found, for example, in "Rapid Object Detection Using a Boosted Cascade of Simple Features", Viola, P; Jones, M; Proceedings of the 2001 IEEE Computer Society on Computer Vision and Pattern Recognition, 2001, CVPR 2001). If the user's face is detected in any one of the training images of the Image set, the face detection algorithm creates a face image:

$$\text{face1}_j = \{pf_{j,i} | i=1 \ldots PF\}$$

In the above equation, an individual face image face1$_j$ is represented by a set of PF pixel values, wherein PF<=P. Furthermore, if the face detection algorithm detects a set of J1 face images of the user in several face images within the Image set, the face detection algorithm creates a face set Face1 consisting of J1 individual face images of the user:

$$\text{Face1} = \{\text{face1}_j | j=1 \ldots J1\}$$

The face images are then pre-processed to ensure consistent face-alignment (step S1.3). This may be achieved by applying eye-detection, scaling, rotation and cropping to each face image face1$_j$ within the face set Face1. Furthermore, intensity, colour, and/or contrast normalisation may be performed to match image properties across the face set. This allows the terminal 1 to perform an accurate comparison of features in subsequent identification phases (described below).

In this embodiment, the pre-processing function is also configured to reject individual face images from the face set Face1 (step S1.4) according to tests on the properties being normalized (this may be due to one face image having poor contrast properties, making it unsuitable for subsequent identification phases). This creates a new face set Face2 of J2 face images, wherein J2<=J1.

$$\text{Face2} = \{\text{face2}_j | j=1 \ldots J2\}$$

The skilled person will understand that each face image may consist of hundreds or thousands of pixel values, with distinguishing features represented by complex inter-dependences within sub-sets of these pixels. Subsequent classification stages (described below) are more tractable by extracting features or feature sets from each face image (known as 'data reduction'). Thus, in step S1.5, a K-feature extraction algorithm creates a feature set feature2$_j$, consisting of K extracted features from each of the J2 face images of the user in the new face set Face2:

$$\text{face2}_j \rightarrow \text{feature extraction} \rightarrow \text{feature2}_j = \{f2_{jk} | k=1 \ldots K\}$$

In this embodiment, the K-feature extraction algorithm disclosed in "Eigenfaces for Recognition", Turk, M; Pentland, A; Journal of Cognitive Neuroscience 3 (1991) is used.

The user's feature set Feature2 may therefore be defined for all K features for all J2 face images within face set Face2:

$$\text{Feature2} = \{\text{feature2}_j | j=1 \ldots J2\}$$

The above description relates to the capture and processing of an arbitrary image to create a feature set for that image. The skilled person will understand that, in practice, the above process will be carried out for many images of many users. In this embodiment, the terminal 1 captures and processes training images for users T1 to TN, such that, for user T1, the terminal 1 creates feature set FeatureT1, in which NT1 represents the number of training images used for user T1:

$$\text{feature}T1_j = \{fT1_{jk} | k=1 \ldots K\}$$

$$\text{Feature}T1 = \{\text{feature}T1_j | j=1 \ldots NT1\}$$

Thus, during the enrolment phase, a user's feature set of K features for all J2 face images of the user in a variety of poses within face set Face2 may be created. As the terminal 1 is configured to create a user's feature set for each user, from user T1 to user TN, a set of training images for each user is captured, from which the user's feature set may be created using the enrolment steps defined above. An all user feature set FeatureT can then be defined, made up of NTN individual user feature sets FeatureTn:

$$\text{Feature}T = \{\text{Feature}Tn, n=1 \ldots NTN\}$$

A template for each user is created, consisting of an identifier for that user and the user's feature set (step S1.6). This is then uploaded to and stored in the secure database via the networking interface 14 (step S1.7). The skilled person will understand that secure and reliable storage is important to ensure the system is robust and the data isn't compromised. The skilled person will also appreciate that the terminal 1 may interact with many users and thus the secure database will store templates for all of these users. Furthermore, the skilled person will understand that it is preferable for the secure database to be located remote to the terminal 1 to reduce the memory storage requirements for the terminal 1 and such that other similar terminals may access the same secure database of templates.

The face recognition method may then operate in either a verification or identification mode. In verification mode, the user indicates their identify to the terminal 1, which then retrieves the user's template from the secure database 14, takes a new image of the user (and performs similar pre-processing and face extraction steps as noted above) and compares the new image to the user's template. If a reliability (i.e. confidence) measure of the comparison passes a threshold, the user's identity is verified.

The skilled person will understand that the verification mode will be particularly applicable to the terminal 1 when implementing the log-on screen. In this example, the user may select their identity on the terminal 1, and in response the terminal 1 may verify the user's identity using the face recognition method outlined above. Once verified, the terminal 1 allows the user to access the home screen, which is then personalized for the user.

In identification mode, the terminal 1 is not aware of the user's identity and therefore performs a one-to-many comparison of a new image of the user against the secure database 14 of templates to identify the user. If the reliability (i.e. confidence) measure of the identity of the user against a particular stored template passes a threshold, then the user is identified using the user identifier associated with that template.

The skilled person will understand that the identification mode is particularly applicable to the terminal when it does not offer a log-on screen (that is, only a home screen which is initially in guest mode until the user is identified). Once the user is identified using the above method, the home screen is personalized for the user. In this way, the terminal 1 may offer authentication and personalization without manual engagement with the user (i.e. a semi-cooperative mode).

The terminal 1, and particularly the processor 11, may be configured to implement any one or any combination of the following methods of the present invention, which will now be described in more detail.

First Method of the Invention

A first embodiment of a first method of the invention will now be described with reference to FIG. 5. In step S2.1, the terminal 1 is initially in a first state, displaying a home screen on the touchscreen display 10 in a guest mode (thus having only limited functionality and has not been signed in to a user's account such that there is no user-specific personalization). In the first state, the processor 11 controls the LED lighting arrays 30a . . . 30f, via the lighting controller 17, to have a low power level such that there is minimal illumination of the area surrounding the terminal 1.

Thus, in this embodiment, the terminal 1 is operating in identification mode (as detailed in the General Overview section above), such that the terminal 1 initially offers a home screen with limited functionality and attempts to identify the user passively (i.e. via a semi-cooperative mode) and, upon identification, the terminal 1 is personalized for the user.

In this mode, the camera 20 is capturing a steam of images and the processor 11 performs some or all of the steps of the face recognition algorithm on each of these captured images (as detailed above in relation to an image captured during the enrolment phase, but the skilled person will understand that these steps equally apply to images captured during the identification phase). For example, an initial image of the stream of images may be analysed up to the face detection step of the face recognition algorithm and, if no face is detected in the image, the algorithm is aborted at this step and a subsequent image of the stream of images is analysed. Alternatively, if a face is detected in the initial image, then it is further processed to determine the identity of the user.

Thus, in step S2.2, a first image is captured by camera 20 of the area in front of the terminal 1. In this embodiment, a user is present in the area in front of the terminal, but there is a large distance between the user and the camera 20.

In step 2.3, the processor 11 performs the face recognition algorithm on the first image to identify the user in the image. Accordingly, the processor 11 performs the steps of detecting a face in the first image, pre-processing the extracted face image, and extracting the feature set from the face images (i.e. a data reduction step) as defined above in relation to the enrolment phase. In this embodiment, the identification step is based on evaluating a distance measure between the user's feature set of the first image and the feature set of an enrolled user. For example, a feature set feature2$_i$ for the first image may be evaluated against a feature set feature T$_j$ of an enrolled user, which calculates a distance measure d$_{ij}$ using distance operator D:

$$d_{ij}=D\{feature2_i, featureT_j\}$$

The distance measure D will typically return a positive scalar value, in which a lower magnitude indicates a closer match between the user's feature set of the first image and the feature set for an enrolled user. In this manner, the user's feature set of the first image may be evaluated against feature sets for all enrolled users:

$$d2_i=\{d_{ij}|j=1 \ldots NT\}$$

In this embodiment, the distance calculation is based on the Euclidean distance as discussed in the "Eigenfaces for Recognition" article referenced above.

The distance set d2$_i$ is a set of distance measures between the first image and all NT feature sets for all enrolled users, and may be analysed to determine the expected identity of the user in the first image. For example, the set of distance measures may be analysed to determine the enrolled user for which the distance measure between the user's feature set for the first image and feature set for the enrolled user is the lowest:

$$dMin_i=Min(d_{ij})j=1 \ldots NT$$

In step S2.4, the processor 11 then determines a reliability (i.e. confidence) measure of the user's identity. In this embodiment, the reliability measure is based on the value of dMin. The skilled person will understand that the dMin value is inversely proportional to the reliability measure (i.e. a relatively low dMin value indicates a relatively high reliability measure). Accordingly, the reliability measure may be derived from the dMin value by a reciprocal function.

As noted above, in this example the distance between the user and camera 20 is initially large and the LED lighting arrays 30a . . . 30f only offer minimal illumination of the area surrounding the terminal (the lighting level is initially set at level L1 ). Accordingly, the reliability measure of the user's identity is initially low.

Figure 5:
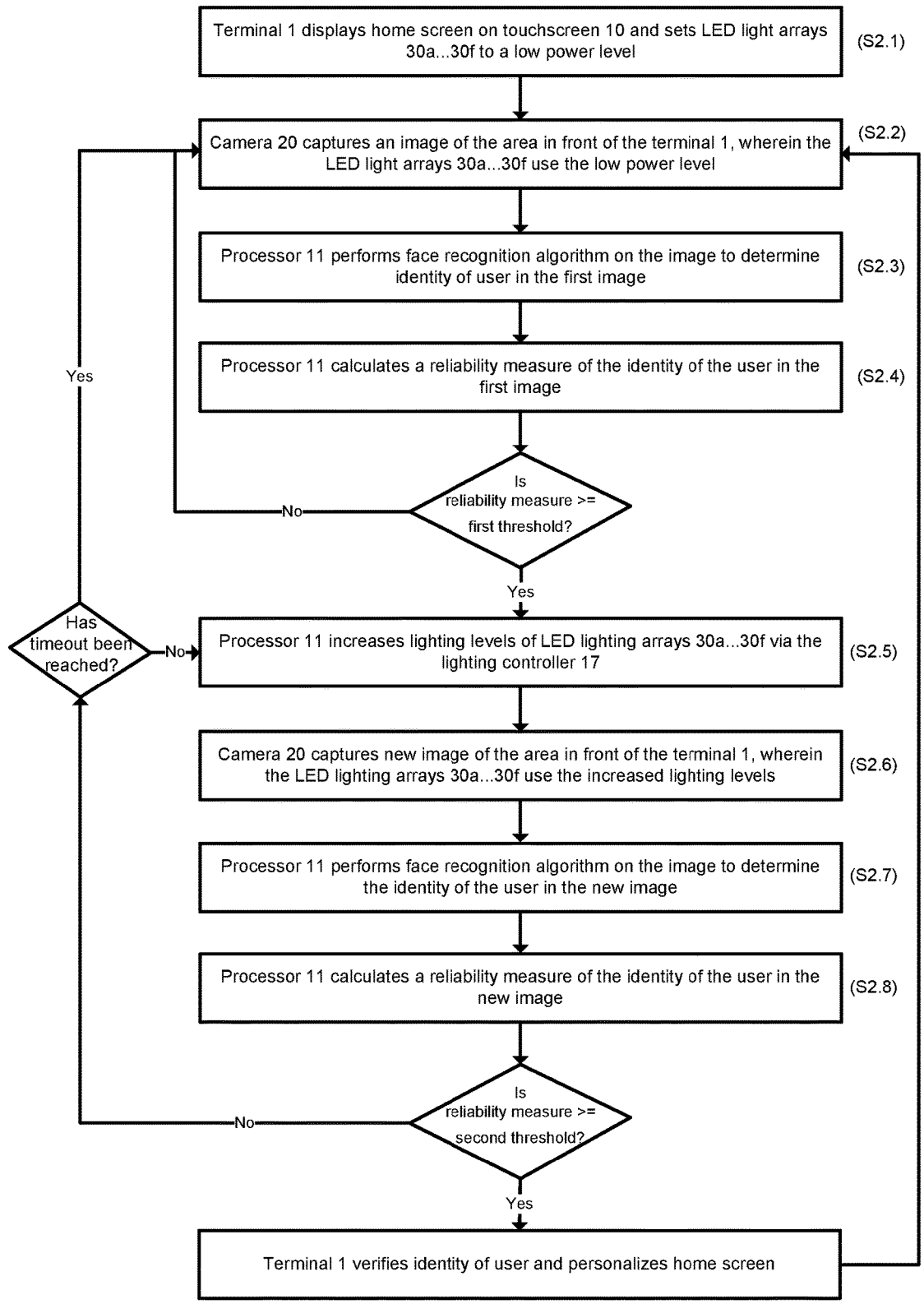
FIG. 5 is a flow diagram of an embodiment of a first method implemented by the interactive terminal of FIG. 1.

As shown in FIG. 5, the reliability measure of the user's identity is compared to a first threshold, dT1, by the processor 11. In this embodiment, the reliability measure of the user's identity using the first image is below the threshold, so the process loops back to step S2.2.

In this embodiment, the user approaches the terminal 1 such that the distance between the user and camera 20 decreases. The LED lighting arrays 30a . . . 30f remain in the first state such that they use the same low power level (level L1 ) such that there is minimal illumination of the area surrounding the terminal 1. However, as the user is now closer to the terminal 1 and to the LED lighting arrays 30a . . . 30f, the illumination of the user's face is increased relative to the illumination level when the first image was captured.

Thus, in the second iteration of step S2.2, a second image is captured by camera 20 of the area in front of the terminal 1. The second image therefore includes the user's face with a more favourable lighting level. The processor 11 then performs a face recognition algorithm on the second image, detects the face in the second image (and performs the same face extraction, pre-processing and data reduction steps as discussed above). The processor 11 thus determines the identity of the user (i.e. the identity of the user associated with the feature set having the lowest value of dMin) and a value of the reliability measure (i.e. derived from the value of dMin) using the distance measurement calculation. As the effect of the terminal's 1 LED lighting arrays 30a . . . 30f was stronger during capture of the second image, the reliability measure of the user's identity using the second image is greater than that using the first image.

In this embodiment, the reliability measure of the user's identity using the second image is greater than the first threshold, dT1. The level of this threshold is set to indicate possible identification (which may be any predetermined value, such as a particular percentage). For example, the first threshold may indicate that the reliability of the user's identity is 60%.

The terminal 1 then reacts to this determination that an image has been captured in which the reliability measure of a user's identity within the image is above the first threshold indicating possible identification. Thus, in step S2.5, the processor 11 controls the LED lighting arrays 30a . . . 30f, via the lighting controller 17, to increase the power level to a first increased level L2, thus illuminating the area surrounding the terminal 1 a greater amount than when the terminal 1 was in the initial state.

In step S2.6, a third image is captured by camera 20 of the area in front of the terminal 1, and in step S2.7, the processor performs a face recognition algorithm on the third image to determine the identity of the user (i.e. the identity of the user associated with the feature set having the lowest value of dMin). In step S2.8, the processor 10 calculates a reliability measure of the identity of the user using the third image (i.e. derived from the value of dMin) using the distance measurement calculation. The skilled person will understand that the reliability measure of the identity of the user will increase as the LED lighting arrays 30a . . . 30f illuminate the user's face by a greater amount. If the reliability measure using the third image is greater than a second threshold dT2, then the user is identified on the terminal 1. The terminal 1 may then log the user into their account, and personalize the terminal 1 for that user (e.g. by displaying specific applications, messages and notifications for that user). The level of the second threshold is therefore set to indicate reliable identification. For example, the second threshold may indicate that the reliability of the user's identity is 90%.

If the reliability measure using the third image is less than the second threshold, then the terminal 1 may continue to iteratively (as shown by the loop back to step S2.5 in FIG. 5) increase the illumination level of the user's face by increasing the power level of the LED lighting arrays 30a . . . 30f via the lighting controller 17, take a new image using the camera 20, performing a face recognition algorithm on the new image by the processor 11 to determine the identity of the user, and calculate the reliability measure of the user's identity using the new image to determine whether the reliability measure is above the second threshold to indicate reliable identification.

In this embodiment, the process is run iteratively for a set period of time until a reliable identification is found or a timeout is reached. Thus, once the terminal 1 gets a reliable identification result from the face recognition, or the timeout is reached, the processor 10 controls the LED lighting arrays 30a . . . 30f, via the lighting controller 17, to return to the initial lighting level L1 (and loop back to step S2.2).

The terminal 1 therefore utilizes a feedback loop to increase the lighting levels of the LED lighting arrays 30a . . . 30f and the illumination of the area surrounding the terminal 1, wherein the feedback loop is based on the reliability measure of the user's identity. In this manner, the lighting level is only increased by an amount which is necessary in order to achieve a reliable identification. This is an improvement over the prior art technique of increasing the lighting level based on the perceived "quality" of an input image, which may result in the lighting level not being increased enough to achieve reliable identification or increased more than is necessary. Thus, the likelihood of the LED lighting arrays 30a . . . 30f being increased to a level that would dazzle the user is decreased (or completely forestalled if the lighting levels are set to only increase to a certain level), making the method more suitable for interactive terminals in which the face recognition technology is not a primary purpose of the device.

In the above embodiment, the lighting level is only increased if a reliability measure of an identity of a user is above a first threshold indicating possible identification. In this manner, the lighting levels are only increased when required by the terminal and when there is a chance of successfully identifying the user. Thus, the lighting levels are not inappropriately increased when there is no or little chance of successful identification (e.g. when the user is not known, or the user's face has changed significantly since the training image was uploaded to the secure database).

Furthermore, once the processor 10 determines possible identification, the lighting levels are increased and the process may be run iteratively for a set period of time until a timeout is reached. This is advantageous as the lighting levels may only be increased for a limited period of time, minimizing disruption to the user.

The skilled person will understand that the values of the thresholds dT1 and dT2 may be determined by experimentation using the training images. Furthermore, these thresholds may be changed during operation of the terminal 1 to modify the point at which the method determines possible or reliable identification.

In the above embodiment, the terminal 1 offers an improved lighting adaption mechanism for use in a face recognition algorithm, which is applied when a user approaches a terminal. Once the user is identified, the terminal 1 may be personalized to that user.

A second embodiment of the first method of the invention, including an enhancement to the above method, will now be described. This embodiment utilizes the same terminal hardware as described in relation to the first embodiment, such that the same reference numerals have been used throughout.

In the second embodiment of the first method of the invention, the terminal 1 initially does not attempt to identify the user as he/she approaches the terminal. Thus, the terminal 1 initially offers a home screen with a limited functionality experience (i.e. without any personalization). The terminal 1 may offer a suite of modules (e.g. applications) which are accessible to the user via the home screen, wherein some modules may be subject to personalization (e.g. an email account module) and some do not have any personalization options (e.g. a settings module).

In this embodiment, the terminal 1 implements the lighting adaption mechanism of the first embodiment of the first method of the invention once the user selects a module on the terminal 1 that requires personalization. Thus, if personalization is not required, then lighting adaptation is restricted. If personalization is required or is soon to be required, then the lighting adaptation mechanism of the first embodiment is implemented. In this manner, the user is only disturbed by increasing lighting levels if personalization is required.

A third embodiment of the first method of the invention will now be described. This embodiment utilizes the same terminal hardware as described in relation to the first embodiment of the first method of the invention, such that the same reference numerals have been used throughout.

In this embodiment, the terminal 1 does not use the LED lighting arrays 30a . . . 30f to illuminate the user's face (and may thus be omitted from the terminal 1 altogether for this embodiment). Instead, illumination of the user's face is managed by the video output 13 of the processor 11 and the touchscreen 10. Accordingly, the processor 11 can vary the lighting levels of the touchscreen 10 by varying the power levels and brightness settings of the display, or varying the proportion of white pixels on the screen.

In one arrangement, the processor 11 can vary the lighting levels of parts of the touchscreen 10, by varying the power levels and brightness settings for those parts of the touchscreen 10 (or varying the proportion of white pixels in that part of the screen). In this manner, the touchscreen 10 can increase the illumination levels around one part of the screen to a greater degree than another part of the screen.

Thus, the terminal 1 may implement the methods of the first embodiment described above (i.e. varying the lighting levels of the user by adjusting the power and brightness settings of the touchscreen 10), without needing any additional lighting equipment.

The above embodiments describe an interactive terminal having a touchscreen adapted to respond to the user's touch input. However, the skilled person will understand that the user may interact with the terminal in other ways, for example, by air gestures or Human Input Devices (HIDs) such as keyboards, mice and trackballs. Furthermore, as noted above, this invention is not limited to interactive terminals but may be generally applied to all face recognition technologies.

The skilled person will also understand that it is not essential for all the steps of the face recognition algorithm (e.g. face detection, pre-processing, data reduction) to be performed in order to gain the advantages of this invention. However, these steps improve the accuracy of the algorithm. Furthermore, it is not essential for all the steps of the algorithm to be implemented on a single processing module. That is, the steps may be implemented by one or more processing modules.

The skilled person will understand that it is not essential for the terminal 1 to be constructed as a single unit. For example, the lighting modules may be provided as a separate entity to the terminal 1, and then may be controlled either through a wired or wireless (e.g. Bluetooth or Wi-Fi) connection. Furthermore, the processing and camera modules may be remotely located, and the images may be transferred between the modules by any suitable communication method.

In the above examples, the illumination levels of the user are adapted by increasing the lighting levels. However, the skilled person will understand that the terminal 1 may improve the accuracy of the face recognition algorithm by adjusting the illumination levels in other ways. For example, the terminal 1 may be configured to control the level of ambient light (such as by closing a blind on a window to block out sunlight). This may improve the reliability measure of the identity of the user in some scenarios, such as when the terminal 1 is placed close to a window such that the image of the user's face is saturated. However, in most circumstances, the accuracy of the face recognition algorithm is improved in response to the increasing the lighting levels, as detailed in the above embodiments.

The first method of the invention includes a two-stage approach to the face recognition process, such that a first face recognition algorithm is performed and, if the reliability measure of the identity of the user passes a first threshold indicating possible identification, the illumination level of the user is adjusted until a subsequent reliability measure meets a second threshold indicating reliable identification. The skilled person will understand that it is not essential for all these steps to be implemented. For example, if the result of the initial face recognition process indicates that the reliability measure is above the threshold indicating reliable identification, then there is no need to increase the lighting levels as the user may be identified on the terminal 1. Furthermore, the skilled person will understand that it is not essential to include the first stage of performing a face recognition algorithm on an initial image to determine if there is at least possible identification. However, it is beneficial as it prevents the terminal from increasing the lighting levels when there is little or no chance of identifying the user.

Second Method of the Invention

A first embodiment of a second method of the invention will now be described with reference to FIGS. 6 to 8. Again, this embodiment utilizes the same terminal hardware as described in relation to the first method of the invention, such that the same reference numerals have been used throughout.

Figure 6:
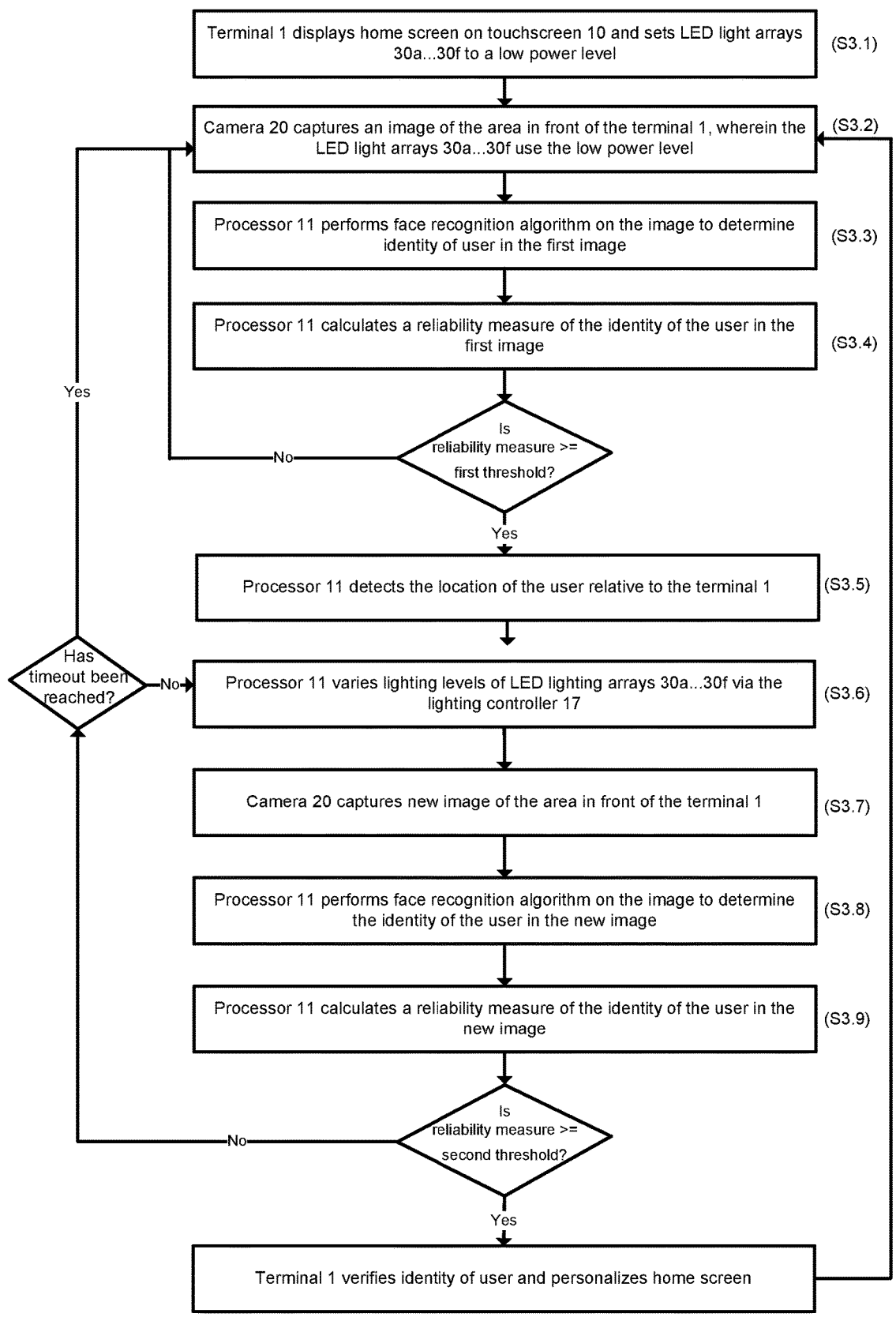
FIG. 6 is a flow diagram of an embodiment of a second method implemented by the interactive terminal of FIG. 1.

In step S3.1 (as shown in FIG. 6), the terminal 1 is initially in a first state, displaying a home screen on the touchscreen display 10 in a guest mode (thus having only limited functionality and has not been signed in to a user's account such that there is no user-specific personalization). In the first state, the processor 11 controls the LED lighting arrays 30a . . . 30f, via the lighting controller 17, to have a low power level such that there is minimal illumination of the area surrounding the terminal 1.

The skilled person will recognize that the terminal 1 is thus operating in identification mode. In this mode, the camera 20 is capturing a stream of images and the processor 11 performs some or all of the face recognition algorithm on each of these captured images (as explained in the General Overview section above in relation to the enrolment phase, but the skilled person will understand that these steps are also applied during the identification phase).

In this embodiment, the terminal 1 is configured to implement similar steps to S2.2 to S2.4, such that the terminal 1 iteratively captures images of a user and processes these images to determine the identity of the user in the image (by performing a face recognition algorithm including the steps of face detection, pre-processing, data reduction and identification as explained above), and determine if a reliability threshold of the identity of the user is above a threshold indicating possible identification (steps S3.2 to S3.4 in FIG. 6).

In this embodiment, the processor 11 is further adapted to detect the location of the user relative to the terminal 1 (step S3.5). As noted above, the face detection element of the face recognition algorithm is configured to detect the user's face within an image captured by camera 20. The location of the user may then be determined in a number of ways. In one example, the processor 11 analyses the user's face to determine the lateral distance between a centre of the touchscreen 10 (and the camera 20) and a centre of the user's face (e.g. this may be determined by calculating a central pixel of the user's face from the image, and comparing this to the number of horizontal pixels in the image). Accordingly, the processor 11 may determine the lateral distance between the centre of the touchscreen 10 and the user based on the lateral distance between the centre of the image and the user's face within the image.

Additionally, the processor 11 may analyse the user's face to determine the distance between the user and the touchscreen 10 (i.e. the longitudinal distance between the user and the terminal 1). For example, this may be based on a comparison of the size of the user's face (e.g. the circumference or diameter) in the image and the average size of all faces in the face set Face1 from the enrolment phase (in this embodiment, the training images used during the enrolment phase require the user to stand at a particular point such that the user is a set distance from the terminal 1). Alternatively, the size of the user's face may be compared to a known object in the image of known size.

Accordingly, the processor 11 may determine both the lateral distance between the centre of the touchscreen 10 and the user, and the longitudinal distance between the touchscreen 10 and the user.

The processor 11 is also configured to implement similar steps to S2.6 to S2.8, such that the processor 11 varies the illumination level surrounding the terminal 1 (step S3.6), the camera 20 captures a new image of the user (step S3.7), and the processor 11 performs a face recognition algorithm on the new image to determine an identity of the user (step S3.8), and calculates a reliability measure of the identity of the user (step S3.9). However, in this embodiment, the terminal 1 implements an improved method of illuminating the user by taking into account the user's location, as explained in the examples below.

Figure 7:
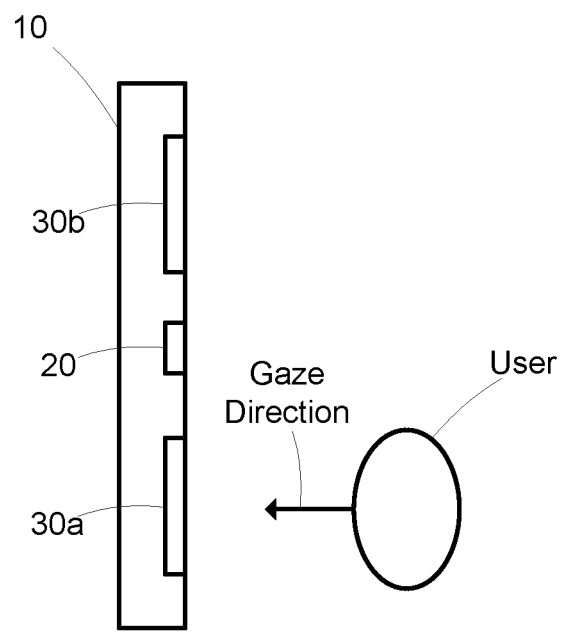
FIG. 7 is a plan view illustrating a user standing in front of the interactive terminal of FIG. 1, wherein the user is laterally offset to the centre of the touchscreen and a first distance from the touchscreen.

In one example, shown in FIG. 7 (illustrating a user being positioned to one side of the terminal 1, such that the user is closer to a first set of lighting arrays 30a, 30e, 30f than a second set of lighting arrays 30b, 30c, 30d), the terminal 1 is configured to vary the illumination by increasing the lighting level of the first set of lighting arrays 30a, 30e, 30f but not the second set of lighting arrays 30b, 30c, 30d. Accordingly, the terminal 1 offers a more direct method of illuminating the user's face such that there is a greater likelihood of achieving a balanced illumination of the face and avoiding strong shadowing from an imbalanced lighting configuration. This increases the likelihood that a reliability measure of the identity of the user determined by a face recognition algorithm on a subsequent image meets the threshold indicating reliable identification. Furthermore, this reduces the amount of light pollution from the terminal 1.

Figure 8:
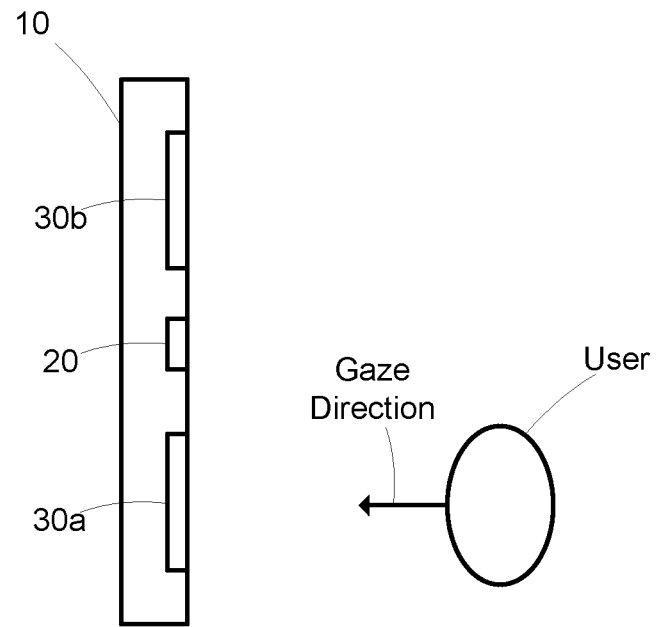
FIG. 8 is a plan view illustrating a user standing in front of the interactive terminal of FIG. 1, wherein the user is laterally offset to the centre of the touchscreen and a second, greater, distance from the touchscreen.

In another example, shown in FIG. 8, (illustrating a user being positioned to one side of the terminal, as in FIG. 7, but further away from the screen), the terminal 1 is again configured to vary the illumination by increasing the lighting level of the first set of lighting arrays 30a, 30e, 30f but not the second set of lighting arrays 30b, 30c, 30d, but the brightness levels are relatively higher than those used in the example above to account for the increased distance between the terminal 1 and the user.

As shown in FIG. 6, the processor 11 is configured to determine if the reliability threshold of the identity of the user using the varied illumination level is above a threshold indicating reliable identification. If not, the process may iteratively loop back to step S3.6, and repeat the steps of varying the illumination level of the user, capturing a new image of the user with the new illumination level, performing a face recognition algorithm to determine the identity of the user and calculate a reliability measure of the identity of the user until the threshold indicating reliable identification is met or a timeout is reached.

In the above examples, the lighting level of the first set of lighting arrays is increased whilst the lighting level of the second set is not increased at all. This maximises the likelihood that a reliability measure of the identity of the user determined on a subsequent image meets the threshold indicating reliable identification (as the face is more evenly illuminated and there are less shadows on the face) and also minimizes the amount of light pollution from the terminal 1. However, the skilled person will understand that this is not essential to the present invention, as the lighting levels for the first and second lights may be adjusted such that the lighting level for one light is greater than the other.

Third Method of the Invention

A first embodiment of a third method of the invention will now be described with reference to FIGS. 9 to 12. Again, this embodiment utilizes the same terminal hardware as described in relation to the first method of the invention, such that the same reference numerals have been used throughout.

Figure 9:
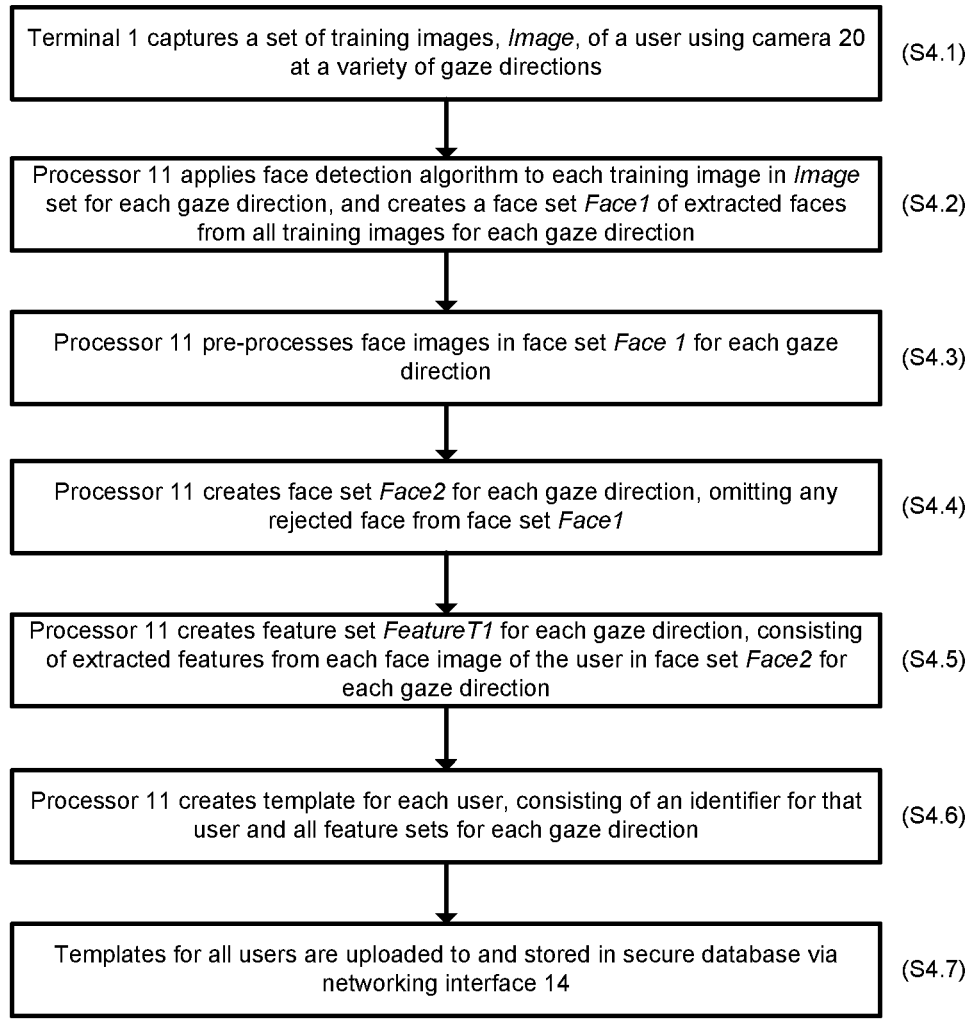
FIG. 9 is a flow diagram of an embodiment of a second enrolment method implemented by the interactive terminal of FIG. 1.
Figure 10:
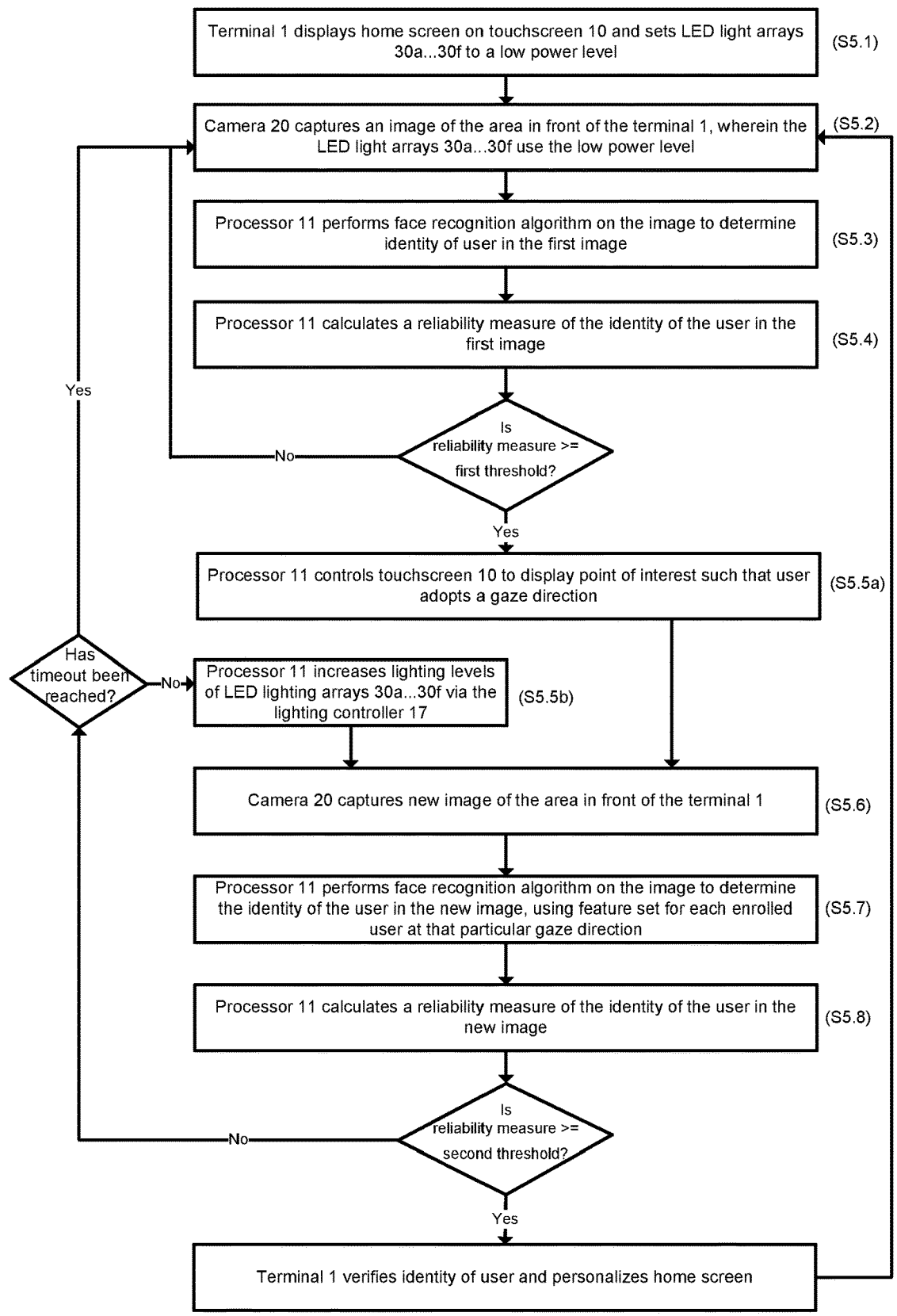
FIG. 10 is a flow diagram of an embodiment of a third method implemented by the interactive terminal of FIG. 1.
Figure 11:
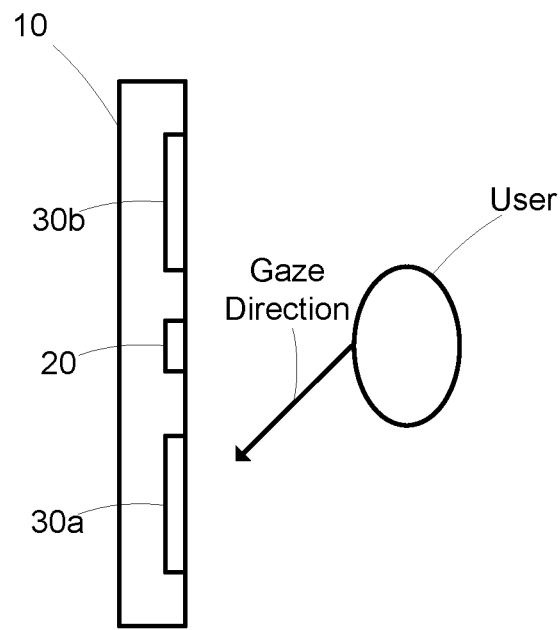
FIG. 11 is a plan view illustrating a user standing in front of the interactive terminal of FIG. 1, having a first gaze direction.

In this embodiment (as shown in FIG. 9), the terminal 1 offers an enrolment phase in which a stream of images is captured for each user at a variety of gaze directions and the user has a feature set created for each of a plurality of categories of gaze direction. For example, the user has a first feature set for a gaze direction being directly towards the camera, a second feature set for a gaze direction towards a left side of the screen, a third feature set for a gaze direction towards the top of the screen, a fourth feature set for a gaze direction towards the right side of the screen, and a fifth feature set for a gaze direction towards the bottom of the screen. Thus, the template for the user includes an identifier for the user and all feature sets for each gaze direction.

The terminal 1 of this embodiment of the invention implements a similar method to the first and/or second method of the invention (e.g. via processor 11). However, in this method, the terminal 1 is adapted to utilize the feature sets at a plurality of gaze directions to improve the accuracy of the face recognition algorithm. This will now be explained in more detail with reference to FIG. 10.

In this embodiment, the user is standing in a central point relative to the terminal 1, the terminal 1 displays a home screen on touchscreen 10 and sets the LED light arrays 30a . . . 30f to a low power level (step S5.1). The processor 11 implements similar steps to steps S2.2 to S2.5 of the first embodiment of the first method of the invention (as shown in the flow diagram of FIG. 10), such that the camera 20 captures a first image of the area in front of the terminal 1, wherein the LED light arrays 30a . . . 30f use the low power level (step S5.2), the processor 11 performs a face recognition algorithm on the image to determine the identity of the user in the first image (step S5.3), and calculates a reliability measure of the identity of the user in the first image (step S5.4). This is repeated iteratively until the reliability measure of the identity of the user is above a first threshold indicating possible identification.

The terminal 1 is adapted to react to the possible identification in the following manner. In this embodiment, the processor 11 is adapted to configure the touchscreen 10 such that there is a point of interest displayed to the user (this may be, for example, an eye-catching icon, picture or video) on a left side of the screen (step S5.5a). This causes the user to alter their gaze direction to that shown in FIG. 11, such that the user is directing their gaze towards the left side of the touchscreen 10.

In the next step of the face recognition algorithm (step S5.6), the camera 20 captures a new image of the user, such that the user has a gaze direction towards the left side of the touchscreen 10 in the new image. In step S5.7, the processor performs a face recognition algorithm using the new image (i.e. performs the steps of face detection, pre-processing and data reduction on the new image, and determines the identity of the user by calculating a distance measurement of the user's feature set of the new image to a feature set for each enrolled user). However, in the third method of the invention, the distance measurement is based on the user's feature set of the new image to a feature set for each enrolled user at that particular gaze direction. The processor 11 thus determines the identity of the user (i.e. the identity of the user associated with the feature set having the lowest distance measurement) and, in step S5.8, a value of the reliability measure (i.e. derived from the value of the lowest distance measurement).

In a similar manner to the first embodiment of the first method of the invention, the reliability measure of the user's identity is compared to a threshold indicating reliable identification. If the reliability measure is below the threshold, the terminal 1 may increase the lighting levels of the LED lighting arrays 30a . . . 30f via the lighting controller 17 (i.e. the process loops to step S5.5b and repeats steps S5.6 to S5.8). This may occur in an iterative manner until the reliability measure is above the threshold indicating reliable identification and the terminal 1 may then be personalized for the identified user. Alternatively, the process is repeated a predetermined number of times or until a timeout is reached if no reliability measure meets the threshold indicating reliable identification.

Figure 12:
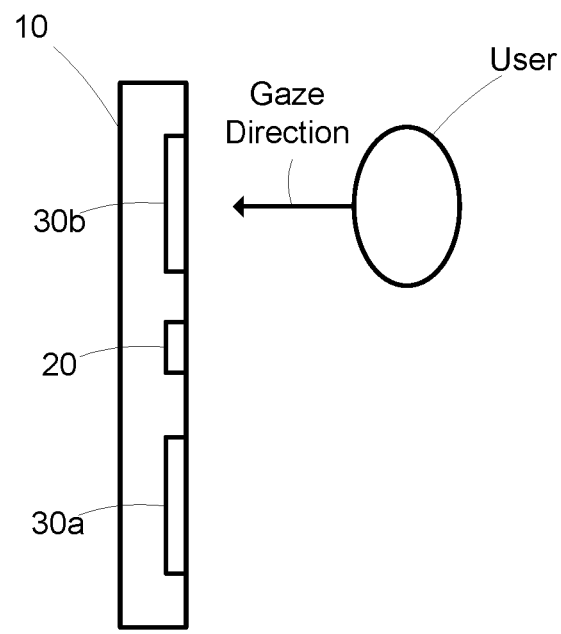
FIG. 12 is a plan view illustrating a user standing in front of the interactive terminal of FIG. 1, wherein the user is standing laterally offset to the centre of the touchscreen and has a second gaze direction.

In a second example, as shown in FIG. 12, the user is positioned to one side of the touchscreen 10 (i.e. the user is laterally offset from the centre of the touchscreen 10 and camera 20). In this example, the terminal again offers an enrolment phase in which a stream of images is captured for each user at a variety of gaze directions and the user has a feature set created for each of a plurality of categories of gaze direction. In the subsequent identification phase, the terminal 1 also utilizes the location of the user (determined in a similar manner to the second method of the invention), to improve the reliability of the face recognition algorithm. This will now be explained in more detail.

In this example, the user is standing to a right side of the terminal 1 (as shown in FIG. 12) and the processor 11 implements similar steps to those described above such that the camera 20 captures a first image of the area in front of the terminal 1, wherein the LED light arrays 30a . . . 30f use the low power level, the processor 11 performs a face recognition algorithm on the image to determine the identity of the user in the first image, and calculates a reliability measure of the identity of the user in the first image. This is repeated iteratively until the reliability measure of the identity of the user is above a first threshold indicating possible identification.

Upon possible identification, the processor 11 is adapted to determine the lateral location of the user relative to the centre of the terminal 1 (for example, by detecting the face of the user and comparing the centre of the detected face to the centre of the image, as described in more detail in the description of the second method of the invention). The processor 11 is further adapted to configure the touchscreen 10 such that there is a point of interest displayed to the user (this may be, for example, an eye-catching icon, picture or video) on a right side of the screen. Accordingly, the point of interest is displayed in front of the user such that the user adopts a forward gaze direction (as shown in FIG. 12).

As the enrolment phase for the terminal 1 involved capturing a stream of images of the user standing central to the terminal 1 at a variety of gaze directions, the skilled person will understand that the most appropriate feature set of the plurality of feature sets at a variety of gaze directions (in this example wherein the user is standing to the right of the terminal 1 with a straight ahead gaze direction) would be the feature set when the user has a gaze direction to the right side of the touchscreen 10. Even though this feature set has a differing gaze direction (the gaze direction in the new image would be straight ahead, whereas the gaze direction in the enrolment image would be to the right), the processor 11 uses this feature set as the features would be most similar to those in the enrolment images due to the user's location being to the right side of the terminal 1. Accordingly, the reliability measure of the identity of the user is improved when using the plurality of gaze directions and the location of the user.

The third method of the invention therefore provides an improved use of training images having varying gaze direction in order to identify a user. In the prior art, an image of the user was compared to a feature set having a variety of gaze directions (forward and angled gazes), in a mitigation technique to alleviate the problems associated with varying gaze directions. However, in the present invention, the terminal 1 controls (i.e. influences) the user's gaze during the image capture part of the face recognition algorithm such that the user adopts a particular gaze direction for the input image. This input image may then be compared to feature sets from the enrolment phase which are categorized for each gaze direction. This method may be further improved by using knowledge of the user's location in addition to controlling the user's gaze.

The third method of the invention may also improve the accuracy of the face recognition algorithm. That is, some features may be more prominent at particular angles (e.g. a nose shape may be more distinguished from an angled gaze than from a front-on view). Accordingly, the face recognition algorithm may produce a greater reliability measure when using an angled gaze feature set to a front-on feature set. Thus, in a further improvement on the third method of the invention, the terminal 1 may perform an initial face recognition algorithm to determine the identity of the user, and if the identity of one or more possible users from this initial face recognition algorithm is a user having a prominent feature at a particular gaze direction, the terminal 1 may then display a point of interest on the screen to encourage the user to adopt that gaze direction. A subsequent face recognition algorithm on a subsequent image of the user at this gaze direction is then more likely to make a correct determination of the identity of the user.

The skilled person will understand that, in the third method of the invention, it is not essential to perform all the steps of the method in order to gain the particular advantages outlined above. That is, the method of influencing the user's gaze direction (such as by using a point of interest on a display) and using an enrolment image classified as having the same or similar gaze direction may be applied in many face recognition algorithms, and is therefore not dependent on having the dual identification stages outlined above in which the user is initially categorized by possible identification. Furthermore, the skilled person will understand that it is not necessary for all the face recognition steps (such as feature extraction) to be performed. However, these steps improve the accuracy of the algorithm.

The skilled person will also understand that it is not essential for the terminal 1 to detect the user's location to gain the advantages of this method of the invention. That is, in most circumstances, the user is likely to be positioned directly in front of the centre of the touchscreen 1 and camera 20 such that detecting the user's location is not necessary. However, this step may be particularly beneficial for terminals 1 having very large screens in which the user may be placed to one side of the screen. In these situations, detecting the user's location and influencing their gaze direction may improve the accuracy of the face recognition algorithm.

The skilled person will understand that any combination of features is possible within the scope of the invention, as claimed.

The invention claimed is:

1. A method of face recognition, the method comprising the steps of:
   (a) performing an initial face recognition algorithm on an initial image of a user to determine the identity of the user including performing a matching process of the initial image of the user with one or more stored images of the user, the initial image having an initial illumination level;
   (b) determining if a reliability measurement of the identity of the user determined by the initial face recognition algorithm meets a first threshold, the first threshold indicating possible identification and, if the reliability measurement is above the first threshold indicating possible identification;
   (c) performing a face recognition algorithm on an image of a user to determine an identity of the user, the image having an illumination level;
   (d) determining if a reliability measurement of the identity of the user determined by the face recognition algorithm meets a second threshold, the second threshold indicating reliable identification and, if the reliability measurement is below the second threshold indicating reliable identification;
   (e) receiving a new image of the user, the new image having an adjusted illumination level; and
   (f) performing a further face recognition algorithm on the new image of the user to determine the identity of the user.

2. A method as claimed in claim 1, further comprising the steps of:
   (g) determining if a reliability measurement of the identity of the user determined by the further face recognition algorithm meets the second threshold indicating reliable identification and, if the reliability measurement is below the second threshold indicating reliable identification, repeating steps (e) and (f).

3. A method as claimed in claim 2, wherein steps (e), (f) and (g) are repeated iteratively.

4. A method as claimed in claim 1, for face recognition on an interactive terminal having a screen, wherein, if the reliability measurement is above the second threshold indicating reliable identification, the method further comprises the steps of:
   personalizing the interactive terminal's screen for the user.

5. A method as claimed in claim 4, wherein the interactive terminal has a screen adapted to display a plurality of functions, the method further comprising the step of:
   personalizing the at least one of the plurality of functions for the user.

6. A method as claimed in claim 4, wherein the interactive terminal further includes a light and the illumination level is adjusted by increasing the lighting level of the light.

7. A non-transitory computer-readable storage medium storing a computer program containing computer-executable code which, when executed on a computer, causes the computer to perform the steps of the method of claim 1.

8. A device for face recognition comprising a processor adapted to:
   (a) perform an initial face recognition algorithm on an initial image of a user to determine the identity of the user, the initial image having an initial illumination level, and wherein performance of the initial face recognition algorithm on the initial image of the user to determine the identity of the user includes performance of a matching process of the initial image of the user with one or more stored images of the user;
   (b) determine if a reliability measurement of the identity of the user determined by the initial face recognition algorithm meets a first threshold, the first threshold indicating possible identification and, if the reliability measurement is above the first threshold indicating possible identification;
   (c) perform a face recognition algorithm on an image of a user to determine an identity of the user, the image having an illumination level;
   (d) determine if a reliability measurement of the identity of the user determined by the face recognition algorithm meets a second threshold, the second threshold indicating reliable identification and, if the reliability measurement is below the second threshold indicating reliable identification;
   (e) receive a new image of the user, the new image having an adjusted illumination level; and
   (f) perform a further face recognition algorithm on the new image of the user to determine the identity of the user.

9. A device as claimed in claim 8, wherein the processor is further adapted to:
   (g) determine if a reliability measurement of the identity of the user determined by the further face recognition algorithm meets the second threshold indicating reliable identification and, if the reliability measurement is below the second threshold indicating reliable identification, repeating steps (e) and (f).

10. A device as claimed in claim 9, wherein the processor is adapted to repeat steps (e), (f) and (g) iteratively.

11. A device as claimed in claim 8, being an interactive terminal and further comprising a screen, wherein, if the reliability measurement is above the threshold indicating reliable identification, the processor is further adapted to personalize the screen for the identified user.

12. A device as claimed in claim 11, wherein the processor is further adapted to display a plurality of functions on the screen, and, if the reliability measurement is above the threshold indicating reliable identification, the processor is adapted to personalize at least one of the plurality of functions for the identified user.

13. A device as claimed in claim 8, further comprising
a light having an adjustable lighting level, wherein the processor adjusts the illumination level by increasing the lighting level of the light.

14. An interactive terminal comprising:
a touchscreen display configured to receive user input;
a camera;
a light source;
a processing system, including a computer processor, for executing computer code so that the processing system is configured at least to:
(a) receive input from the touchscreen display;
(b) obtain an initial image of a user using the camera;
(c) perform an initial face recognition algorithm on the initial image of a user to determine the identity of the user, the initial image having an initial illumination level, and wherein performance of the initial face recognition algorithm on the initial image of the user to determine the identity of the user includes performance of a matching process of the initial image of the user with one or more images of the user;
(d) determine if a reliability measurement of the identity of the user determined by the initial face recognition algorithm meets a first threshold, the first threshold indicating possible identification and, if the reliability measurement is above the first threshold indicating possible identification:
(e) perform a face recognition algorithm on an image of a user to determine an identity of the user, the image having an illumination level; and
(f) determine if a reliability measurement of the identity of the user determined by the face recognition algorithm meets a second threshold, the second threshold indicating reliable identification, and if the reliability measurement is below the second threshold indicating reliable identification:
(g) adjust an illumination level using the light source;
(h) obtain a new image of the user having the adjusted illumination level using the camera; and
(i) perform a further face recognition algorithm on the new image of the user to determine the identity of the user.

15. An interactive terminal as in claim 14, wherein the processing system is further configured to personalize a screen displayed on the touchscreen display for the user.

* * * * *